Aug. 16, 1966     H. O. CORBETT     3,266,092
BALANCED FLOW DIE
Filed Aug. 27, 1962     3 Sheets-Sheet 1
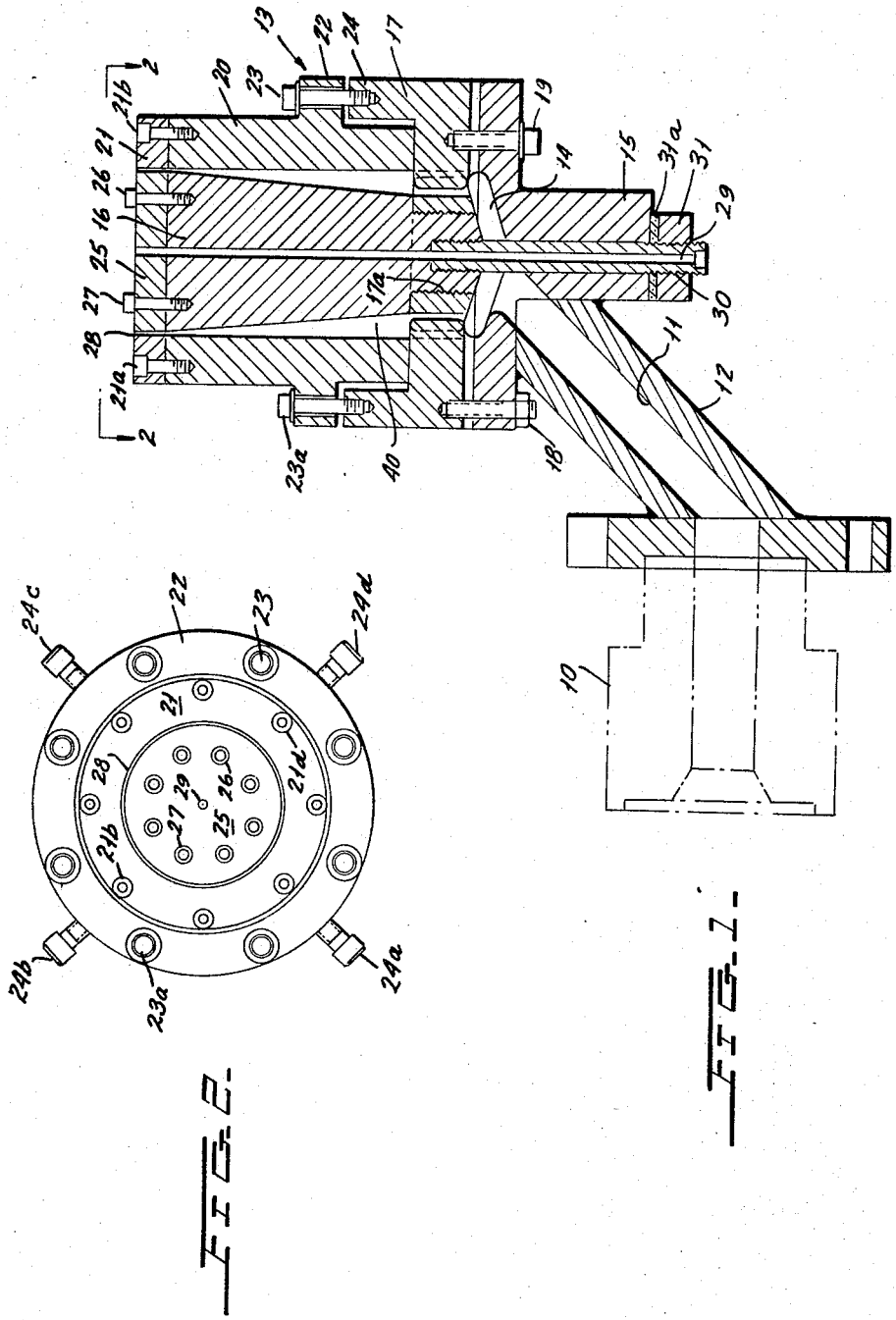
INVENTOR.
HERBERT O. CORBETT
BY *E. J. Berry*
ATTORNEY Aug. 16, 1966   H. O. CORBETT   3,266,092
BALANCED FLOW DIE
Filed Aug. 27, 1962   3 Sheets-Sheet 2
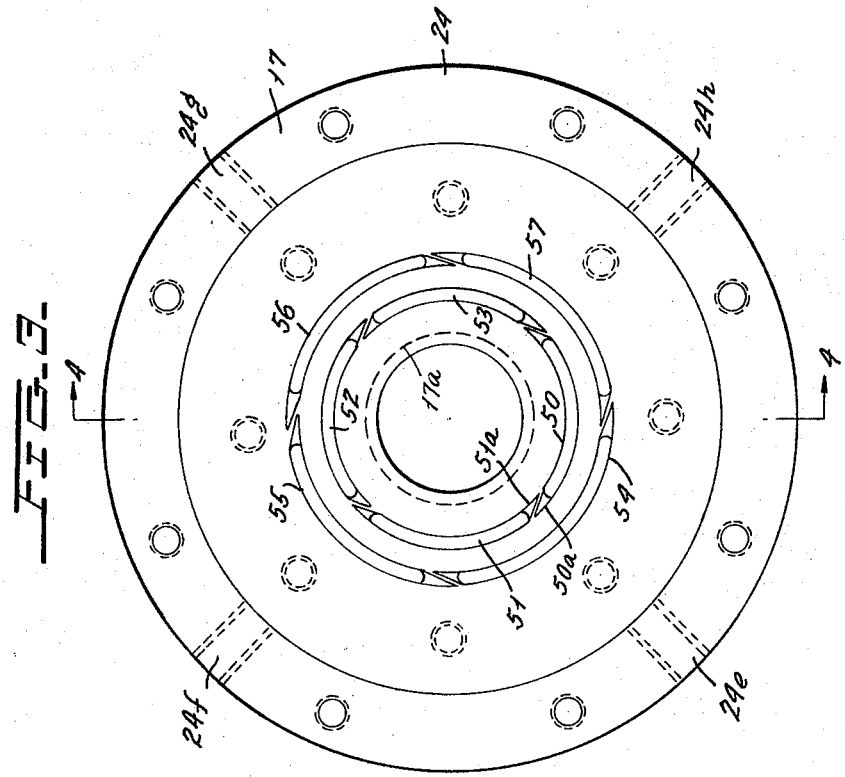
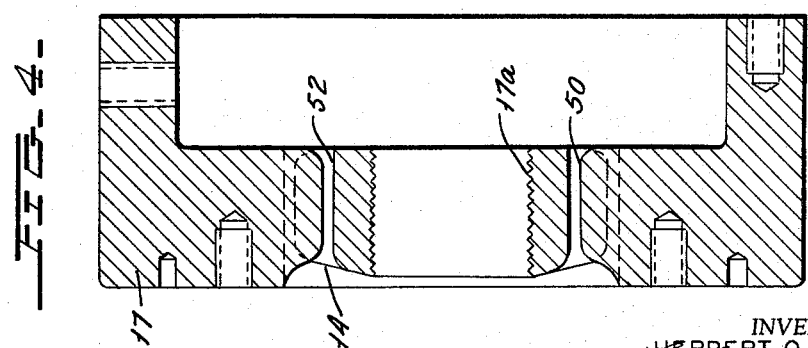
INVENTOR.
HERBERT O. CORBETT
BY E. J. Berry
ATTORNEY Aug. 16, 1966　　　H. O. CORBETT　　　3,266,092
BALANCED FLOW DIE
Filed Aug. 27, 1962　　　　　　　　　　　　3 Sheets-Sheet 3
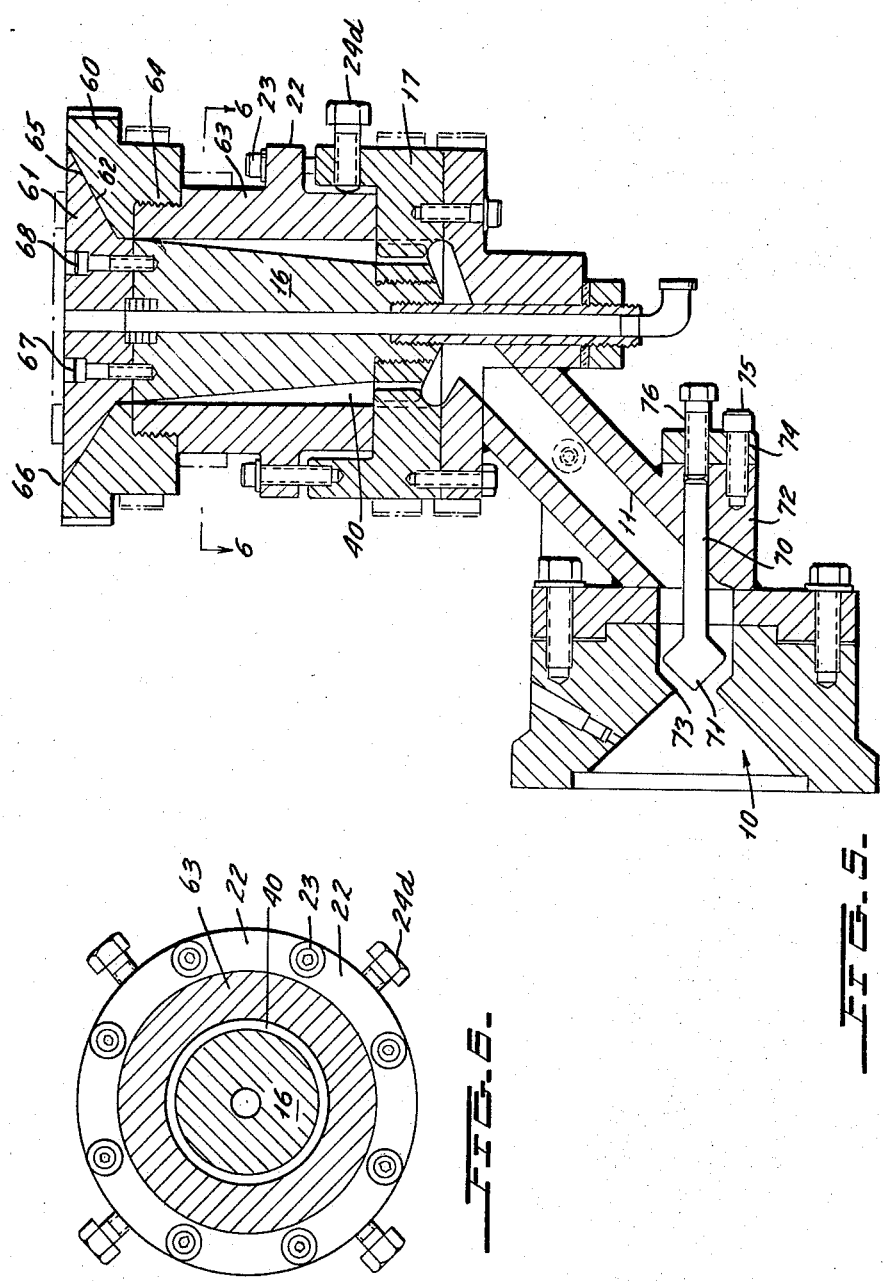
INVENTOR.
HERBERT O. CORBETT
BY E. J. Berry
ATTORNEY 3,266,092
BALANCED FLOW DIE
Herbert O. Corbett, Canandaigua, N.Y., assignor to National Distillers and Chemical Corporation, New York, N.Y., a corporation of Virginia
Filed Aug. 27, 1962, Ser. No. 219,469
4 Claims. (Cl. 18—14)

This invention relates to a novel die construction for the extrusion of thin plastic film and more specifically relates to a die structure for extruding tubes of thin plastic film wherein joining flows of molten plastic overlap one another so that seam lines are eliminated. Dies for the extrusion of various types of thermoplastic materials such as polyethylene or polypropylene are well known in the art. Normally, the molten resin is forced through an annular orifice to be formed as a tube which is continuously pulled out of the orifice which serves as the die. In the past, the molten plastic enters the die in two or more streams. These streams join one another before passing through the tube forming orifice. The points at which the streams join have been found to form a seam or enlarged bead-type section in the extruded film so as to distract from the appearance of a finished product. The principle of the present invention is to provide a novel feed system for mixing the molten resin prior to its entry into the annular orifice so that discrete paths of flow overlap one another and thus prevent the formation of the seam lines described above.

As a further additional feature of the invention the die may be provided with a removably connected orifice plate which can be connected to a common mandrel section whereby the same major portion of the die can be used for the extrusion of a wide range of diameters of plastic tube.

As a still further feature of the invention a novel static-flow valve is provided for controlling the mass flow of molten resin into the die.

Accordingly, a primary object of this invention is to provide a novel die for the extrusion of tubular plastic film.

Another object of this invention is to provide a novel balanced die for the extrusion of thin plastic film wherein seam lines caused by the joining of one or more molten resin flow paths are eliminated.

A still further object of this invention is to provide a novel balanced die for the extrusion of tubes of polyethylene or polypropylene films having thicknesses of the order of 0.4 to 20 mils.

A still further object of this invention is to provide a novel die for the extrusion of plastic film wherein a removably connected orifice plate is secured to the die so that one main die body can be used in the extrusion of a wide range of tube diameters.

A still further feature of this invention is to provide a novel valve construction for controlling the flow of molten resin to an extruding die.

These as well as other objects of this invention shall become apparent after reading the following description of the drawings in which:

FIGURE 1 shows a side cross sectional view of a die constructed in accordance with the present invention.

FIGURE 2 shows a plan view of FIGURE 1 when seen from lines 2—2 in FIGURE 1.

FIGURE 3 is a plan view of the die anchor ring of FIGURE 1.

FIGURE 4 is a cross sectional view of the die anchor ring of FIGURE 3 when taken across lines 4—4 in FIGURE 3.

FIGURE 5 is a side cross sectional view of a die using the novel balanced flow principles illustrated in FIGURE 1 wherein the orifice ring is removable and replaceable with rings of different orifice diameter and further illustrates the use of a static valve for controlling introduction of molten resin to the die.

FIGURE 6 is a cross sectional view of FIGURE 5 when taken across lines 6—6 in FIGURE 5.

Referring now to FIGURES 1 through 4, the novel die shown therein is connected to any appropriate source 10 of a forced fed molten resin such as polyethylene. The molten resin is forced up through channel 11 of conduit 12 at a pressure which can be controlled by valve means as will be described more fully hereinafter.

The resin then enters the die 13 at the main chamber 14 which is formed between the die adapter 15 and the die mandrel 16. The die adapter 15 which is welded to member 12 and may be supported thereby is secured to die anchor ring 17 by a plurality of bolts such as bolts 18 and 19. The lower portion of mandrel 16 is then threaded into threaded opening 17a of die anchor ring 17.

The die anchor ring 17 then receives the die body 20 which has an outer orifice plate 21 bolted thereto by a plurality of bolts such as bolts 21a and 21b.

Die body portion 20 has an extending flange portion 22 which has a plurality of through openings to receive a respective plurality of bolts such as bolts 23 and 24. The plurality of bolts such as bolts 23 and 23a then thread into respective threaded openings in the projecting rim 24 of die anchor ring 17. Alignment of die ring orifice plate 21 can then be controlled by proper adjustment of the various bolts such as bolts 23 and 23a, which extend around flange 22. Another set of adjusting bolts such as bolts 24a, 24b, 24c and 24d (FIGURE 2) pass through threaded openings 24e, 24f, 24g and 24h, respectively, in rim 24 and bear against die body 20 to permit lateral adjustment of plate 21.

The mandrel 16 then receives a mandrel orifice plate 25 by bolt means such as bolts 26 and 27 where the plates 25 and 21 define the annular orifice 28 through which the plastic tube is extruded.

Clearly, appropriate adjustment of the bolts in flange 22 and rim 24 will cause the configuration of orifice 28 to have the appropriate shape for the extrusion process whereby there is a constant distance between all points of the outer diameter of plate 25 and the inner diameter of plate 21 and the plate 21 and 25 are flush.

In order to provide air in the tube being extruded or some similar gas which will hold the tube inflated, a source of air can be connected to conduit 29 which extends completely through the die by means of the core pin air tube 30 which extends between the die body portion 15 and mandrel 16. Mandrel 16 threadably receives the upper end of core pin 30 while the lower end of core pin 30 is secured to the bottom of die body 15 by a nut such as nut 31 and gasket 31a.

It is noted that all of the foregoing structures are essentially similar to structures which have been hereinbefore used. The principle of the present invention lies in the manner in which the molten resin is taken from chamber 14 of FIGURE 1 to the chamber 40 which is created between the outer diameter of mandrel 16 and the inner diameter of die body 20.

In accordance with the invention and as best seen in FIGURES 3 and 4 the die anchor ring 17 is provided with an inner set of orifices or flow passages 50, 51, 52 and 53 which are overlapped by a set of orifices or flow passages 54, 55, 56 and 57. Each of the orifices 50 through 57 communicate between the main entrance chamber 14 and area 40 whereby, as will be understood from FIGURES 3 and 4, the molten fluid is divided into four inner streams and four concentric outer streams. Each of the streams are then caused to overlap one another where, for example, streams coming from slots 52 and 56 will overlap and will not join one another along a descrete line.

Accordingly, as the fluid enters chamber 40 there is no main juncture between the streams entering chamber 40 so that the tube ultimately extruded at orifice 28 will not have visible seams.

While FIGURES 3 and 4 illustrate four interior streams and four cencentric and overlapping outer streams, it is to be understood that the concept proposed herein can be extended to any overlapping of elongated streams of a molten resin whereby such overlapping prevents seam lines in the ultimately extruded product.

It will be further noted that the adjacent slots of each of the rings of slots are tapered outwardly and in overlapping relationship where the slots emerge into the chamber 40. By way of example, slot 50 has a first tapered end section 50a which overlaps with the tapered end section 51a of slot 51. It has been found that such overlapping relationships improves the non-seam forming characteristics of the system.

A second embodiment of the novel die structure shown in FIGURES 5 and 6 where components similar to those in FIGURES 1 through 4 have been given similar identifying numerals.

The first novel feature of modification of FIGURES 5 and 6 is in the outer and inner orifice plates 60 and 61. The outer plate 60 has the outwardly flared orifice surface 62 and is removably secured to the die body portion 63 by the threaded engagement 64. An interior orifice plate 61 has an outwardly tapered orifice surface 65 which cooperates with the orifice surface 62 to define an annular outpart orifice 66 of some particular diameter. Interior plate 61 is then bolted to mandrel 16 as by the bolts 67 and 68. The novel orifice plate arrangement shown in FIGURE 5 permits the easy removal of plates 61 and 60 and replacement by a similar pair of plates which can give a different diameter for orifice 66. Thus, the novel die of FIGURE 5 permits the easy and simple modification of a particular tube size without requiring replacement of the complete die structure as has been required in the past. Note that the die is capable of any orfiice diameter where the orifice surface 62 could flare inwardly as well as outwardly. A typical range of orifice diameters for the illustrated die could be from 2 to 10 inches.

Clearly, the same type of die anchor ring 17 is used in the embodiment of FIGURE 5 for producing a similar tube as described in FIGURES 1 through 4. Note, however, that the novel demovable and replaceable orifice plate portions of FIGURE 5 could be used in dies which do not include this type of die anchor ring.

FIGURE 5 additionally shows a novel manner in which the flow of molten resin through channel 11 can be controlled.

More specifically, FIGURE 5 illustrates a valve member 70 which has an enlarged head 71. The valve 70 is slidably received in adapter plate 72 and cooperates with a ring valve seat 73 which controls the flow of molten resin from the chamber 10 to opening 11. If desired, valve 70 can be keyed against rotational plate 72. A plate 74 is then secured to member 72 as by the bolt 75 and threadably receives the adjusting bolt 76 which makes abutting contact with the right hand end of valve member 70.

This novel arrangement permits the valve 70 to be moved toward or away from valve seat 73 without requiring rotation of valve member 70. Thus an extremely accurate and close control of the fluid flow into the die is achieved without imbalance caused by non-symmetry of valve head 71 and seat 73.

Furthermore, this valve design causes the molten polymer flow to be divided around it, thereby overlaying any weld lines. Also, the polymer seeks an elliptical shape over the stem which results in a more streamline path than in the past. This is very important to successful operation and prevents "burn-in" of polymers. Furthermore, the valve can be rotated in any fixed position to flush itself when used with highly critical thermoplastics such as unplasticized polyvinyl chloride.

Although preferred embodiments of the invention have been described, many variations and modifications will now be obvious to those skilled in the art, and it is preferred therefore to be limited not by the specific disclosure herein but only by the appended claims.

What is claimed is:

1. A balanced flow die for extruding plastic film comprising an extruding orifice, a chamber leading to said extruding orifice, and a member for introducing molten plastic into said chamber; said member having a first and second plurality of flow passages extending therethrough which passages have elongated, annular, concentric shapes, the flow passages in said first plurality having adjacent ends and the flow passages in said second plurality having adjacent ends, said ends being tapered and nested with respect to one another, and the flow passages of said first plurality radially overlapping the adjacent ends of the flow passages of said second plurality.

2. A balanced flow die for extruding plastic film as defined in claim 1, in which said first and second plurality of flow passages form first and second concentric tubes, respectively.

3. A balanced flow die for extruding plastic film as defined in claim 1, in which said second plurality of flow passages is adjacent to and in spaced concentric relation with respect to, said first plurality of flow passages.

4. A die anchor ring for a plastic film extruding die; said die anchor ring having a first and second plurality of flow passages extending therethrough which passages have elongated, annular, concentric shapes, the flow passages in said first plurality having adjacent ends and the flow passages in said second plurality having adjacent ends, said ends being tapered and nested with respect to one another, and the flow passages of said first plurality radially overlapping the adjacent ends of the flow passages of said second plurality.

References Cited by the Examiner

UNITED STATES PATENTS

| | | | |
|---|---|---|---|
| 2,269,865 | 1/1942 | Shaw | 251—318 |
| 2,461,630 | 2/1949 | Cozzo. | |
| 2,462,291 | 2/1949 | Sette | 251—318 |
| 2,469,999 | 5/1949 | Stober. | |
| 2,636,218 | 4/1953 | Orsini. | |
| 2,682,081 | 6/1954 | Fisch | 264—173 X |
| 2,834,054 | 5/1958 | Maddock et al. | 264—209 |
| 2,932,323 | 4/1960 | Aries | 264—209 X |
| 2,944,287 | 6/1960 | Moran | 264—209 X |
| 3,029,474 | 4/1962 | Voigt et al. | 264—207 |
| 3,051,989 | 9/1962 | Mercer. | |
| 3,099,860 | 8/1963 | Schippers | 264—207 |
| 3,103,409 | 9/1963 | Bohves et al. | 264—209 |

ROBERT F. WHITE, *Primary Examiner.*

ALEXANDER H. BRODMERKEL, *Examiner.*

J. R. DUNCAN, J. R. HALL, *Assistant Examiners.*